(12) United States Patent
Dobbie et al.

(10) Patent No.: US 6,560,029 B1
(45) Date of Patent: May 6, 2003

(54) VIDEO ENHANCED NIGHT VISION GOGGLE

(75) Inventors: Blair R. Dobbie, Roanoke, VA (US);
Charles D. Willey, Roanoke, VA (US);
David E. Mattey, Vinton, VA (US);
Steven A. Brillhart, Vinton, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/024,140

(22) Filed: Dec. 21, 2001

(51) Int. Cl.[7] .............................. G02B 27/14; A42B 1/24
(52) U.S. Cl. .............................. 359/631; 359/630; 2/6.1
(58) Field of Search .................................. 359/631, 630, 359/146, 629, 13, 632, 633; 345/8; 348/158, 216; 351/243; 2/5, 6.1, 6.2, 6.6

(56) References Cited

U.S. PATENT DOCUMENTS

| | | | |
|---|---|---|---|
| 5,113,177 A | 5/1992 | Cohen ........................... 345/8 |
| 5,200,827 A | * 4/1993 | Hanson et al. ............... 348/216 |
| 5,373,320 A | * 12/1994 | Johnson et al. ................ 345/6 |
| 5,815,126 A | * 9/1998 | Fan et al. ....................... 345/8 |
| 5,949,582 A | 9/1999 | Coombs ....................... 359/630 |
| 5,995,291 A | * 11/1999 | Togino ........................ 359/631 |
| 6,057,966 A | 5/2000 | Carroll et al. .............. 359/630 |
| 6,195,206 B1 | 2/2001 | Yona et al. .................. 359/630 |

OTHER PUBLICATIONS

Microdisplays Author, Greg Vrana, Technical Editor, No Longer a Microcosm, Mar. 15, 2001.

* cited by examiner

Primary Examiner—Georgia Epps
Assistant Examiner—Omar Hindi
(74) Attorney, Agent, or Firm—Edell, Shapiro & Finnan, LLC; Martin Abramson

(57) ABSTRACT

A man portable video enhanced night vision goggle comprised of a head mount assembly, an image intensified video camera, and a display. A thermal camera may also be provided and the images from the video camera and the thermal camera may be electronically fused on the display.

50 Claims, 11 Drawing Sheets

VIDEO ENHANCED NIGHT VISION GOGGLE

CROSS REFERENCE TO RELATED APPLICATIONS

This application is related to U.S. patent application Ser. No. 10/124,136 entitled "Wide Angle Display Device Using Compact Prism Eyepieces" and U.S. patent application Ser. No. 10/024,346 entitled "Head Mount for Vision Enhancement Devices", filed on even date herewith. The disclosures of both such applications are in their entireties incorporated herein by reference.

FIELD OF THE INVENTION

The present invention is directed to video enhanced night vision goggles.

BACKGROUND OF THE INVENTION

Conventional, direct view night vision goggles have been in widespread use for several decades. All variants of the currently fielded hardware are based on a common optical architecture. This architecture consists of an objective lens, an image intensifier tube, and an eyepiece lens. Functionally, the objective lens focuses an image of a low light level scene onto the intensifier input plane (the photocathode). The intensifier tube amplifies this faint image and presents the brighter image on its output surface. The eyepiece lens allows a human eye to view the amplified image. The classical arrangement of these components is coaxial, with the objective lens, the image tube and the eyepiece lens sharing a common optical axis. This produces what is effectively a unity power telescope that has the ability to intensify low light level scenes and make them visible to a human observer. This telescopic device is typically positioned forward of the user's eye by various means. There are common variations of this basic optomechanical architecture in which various optical folding mirrors and beamsplitters may be introduced into the optical path for the purpose of changing the overall telescope package shape. All variations of this basic night vision goggle (NVG) architecture, however, share a common attribute. They provide an intensified image by allowing the user to view the output "screen" of the intensifier tube through a magnifying eyepiece optical train. For this reason, the conventional NVG architecture is often referred to as a "direct view" system because the observer views the image intensifier screen directly.

The image intensifier tube is also used in image intensified video cameras for specialized applications. The two primary areas of use for these cameras have been for scientific research and for surveillance. The surveillance applications are in the civilian security and military areas. In most of the prior uses of image intensified video cameras the devices have been either in a fixed site (such as a pan and tilt surveillance pedestal) or on a vehicle that can provide adequate electrical power as well as mechanical support. For example, in military applications the devices have been located typically either in an aircraft or ground tactical vehicle.

While presently fielded night vision goggles are in general adequate for their intended tasks, they have a number of shortcomings that compromise the effectiveness of the user. A major disadvantage is that the size and weight of existing night vision goggles tends to limit the mobility of the observer. Thus, it is important for a soldier be able to move freely to engage in such activities as running, rolling, crawling, etc. while the night vision goggle continues to be deployed and functioning. Such activities are referred to by the military as Individual Movement Techniques (IMT).

The presently fielded night vision goggle is typically a single, integrated unit that is placed in front of a user's eyes. Such placement is accomplished either by the user holding the device by hand or with the use of a head or helmet mounting scheme. Present night vision goggle head mounting is generally accomplished by either mounting the goggle to a helmet or by use of a strap/harness device that is worn on the user's head. There are significant problems with both approaches. The helmet is designed to protect the user's head from injury in tactical situations and does this, in part, by "floating" on the skull. This results in an extremely poor platform for any kind of viewing device. Many NVG optical systems are "exit pupil forming" systems. To view the image from such systems the exit pupil of the NVG must coincide with the user's eye pupil. The helmet mounted systems often fail to provide full imagery to the user because normal movement such as walking or running causes the helmet, and the exit pupil, to move.

The strap/harness device mounting approach is an attempt to avoid the helmet platform and mount the vision device to the same platform as the users eyes. This alleviates the exit pupil to eye pupil alignment problem. It does create another problem, however, that also degrades the user's effectiveness. The typical NVG may weigh 1–2 pounds and has a profile created by a coaxial lens train which extends far in front of the user's eyes. Such device must be cantilevered securely in front of the viewers eyes, and the strap/harness device accomplishes this only when it is painfully tight on the users head. The resulting discomfort makes it difficult for users to accomplish their assigned tasks and duties.

Presently field night vision goggles have additional limitations. Thus, such devices are "personal vision devices", and in the same way as in a pair of binoculars, the image from current devices is provided only to the individual user and cannot be "exported" or transmitted to other users. It is not easy or convenient to process the optically generated image provided by the direct view NVG.

Additionally, the presently field night vision goggle incorporates a simple automatic electronic scheme for maintaining image quality over light levels ranging from twilight to overcast starlight. There are scene lighting conditions, however, that compromise the image quality of the NVG and thus reduce the effectiveness of the user. Examples of such conditions include scenes with wide brightness dynamic range, and daylight scenes. The user must be able to operate effectively in these situations and has difficulty doing so with the images provided by present systems.

Present night vision systems provide either an intensified image of the visible and near infrared (NIR) spectrum or an image based on sensitivity to one of the infrared atmospheric windows. NVGs and image intensified cameras provide images by sensing the visible and NIR wavelengths. Thermal cameras provide imagery of the 3–5 micron and 8–12 micron bandpasses. It would be advantageous to integrate the imagery from both types of sensors.

BRIEF SUMMARY OF THE INVENTION

It is thus an object of the present invention to provide a man portable night vision goggle device which permits a user more freedom of movement than prior art devices.

In accordance with an aspect of the invention, a night vision device is provided which comprises a head mount, an image intensified video camera secured to the head mount, and a display comprised of an electrically operated flat panel and an optical eyepiece, which is secured to the head mount in such position that when the head mount is worn by a user, both the flat panel display and the eyepiece are located forward of the user's eyes.

Thus, unlike the prior art, which uses a direct view optical train having a relatively long profile, the present invention employs a video camera and display. Such components can be made lighter in weight than in the direct view configuration and the screen and optical eyepiece do not extend far in front of the viewer's eyes. Thus, the user has better mobility while the device is deployed and can more comfortably engage in a fuller range of activities.

BRIEF DESCRIPTION OF THE DRAWINGS

The invention will be better understood by referring to the accompanying drawings, wherein.

DETAILED DESCRIPTION OF PREFERRED EMBODIMENT

Figure 1A:
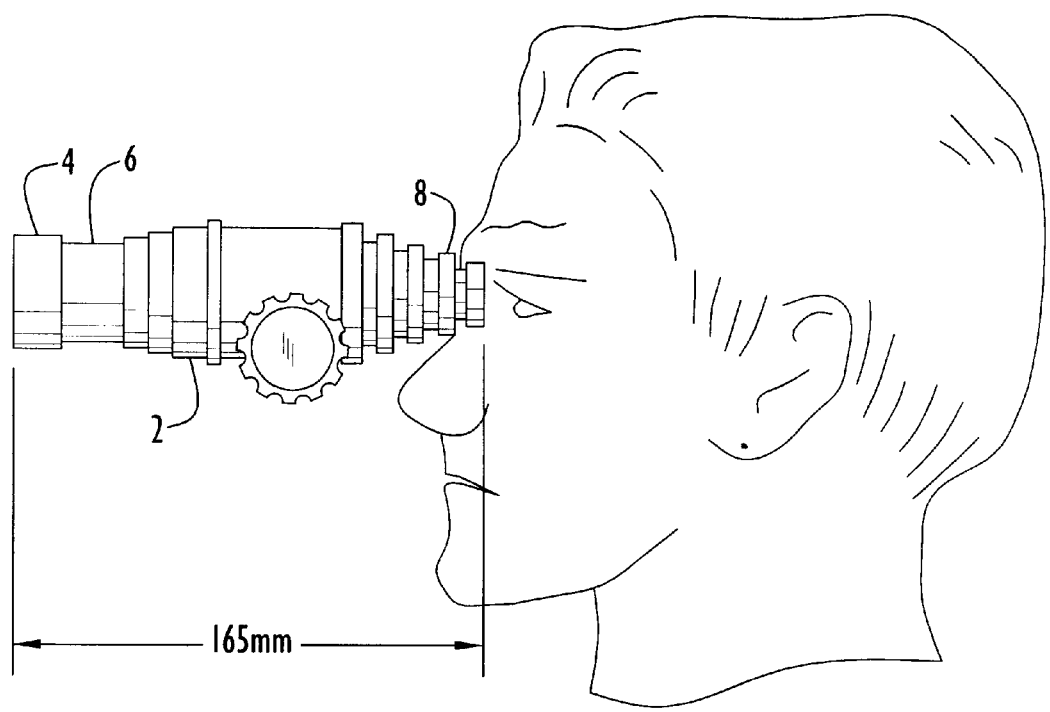
FIG. 1A shows a direct view night vision goggle of the prior art, as could be head mounted with straps.

FIG. 1A depicts a prior art direct view type night vision goggle. Barrel 2 contains optical components including an objective lens assembly 4, image intensifier tube 6 and coaxial eyepiece assembly 8, with the overall shape being similar to that of a telescope. Barrel 2 is suspended from the head of an observer either by being mounted to a helmet or with a strap/harness assembly as previously described.

The prior art night vision goggle may weigh two to four pounds and may be about 165 mm in length. In a harness type device, the goggle must be cantilevered securely in front of the observer's eyes, and as previously mentioned, this can be accomplished only when the harness is painfully tight on the observer's head. The resulting discomfort makes it difficult for the user to accomplish necessary tasks and duties. On the other hand, if mounted to a helmet, visual misalignments between the observer's eyes and the exit pupil of the device may result.

Figure 1B:
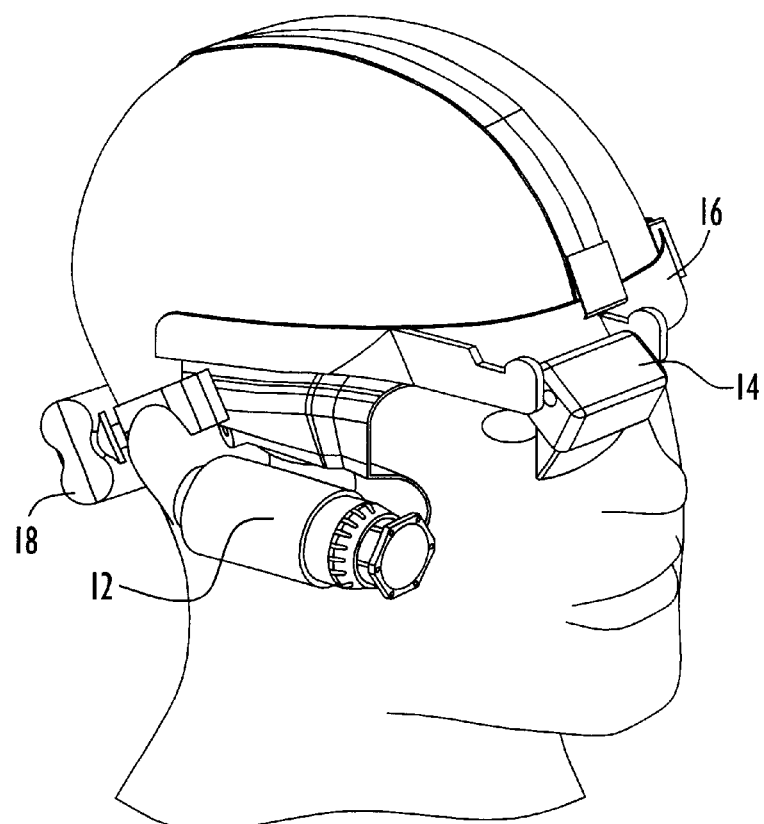
FIG. 1B shows an embodiment of the basic video enhanced night vision goggle of the invention as worn by a user.

FIG. 1B shows an embodiment of the present invention as worn by a user. Instead of using direct view optics, the present invention uses an image intensified video camera 12 and video display 14 in front of the eye of the user to display the image. It can immediately be seen by referring to FIG. 1B that the device of the present invention is more compact than that of the prior art and will allow the user greater comfort and freedom of movement.

Figure 2A:
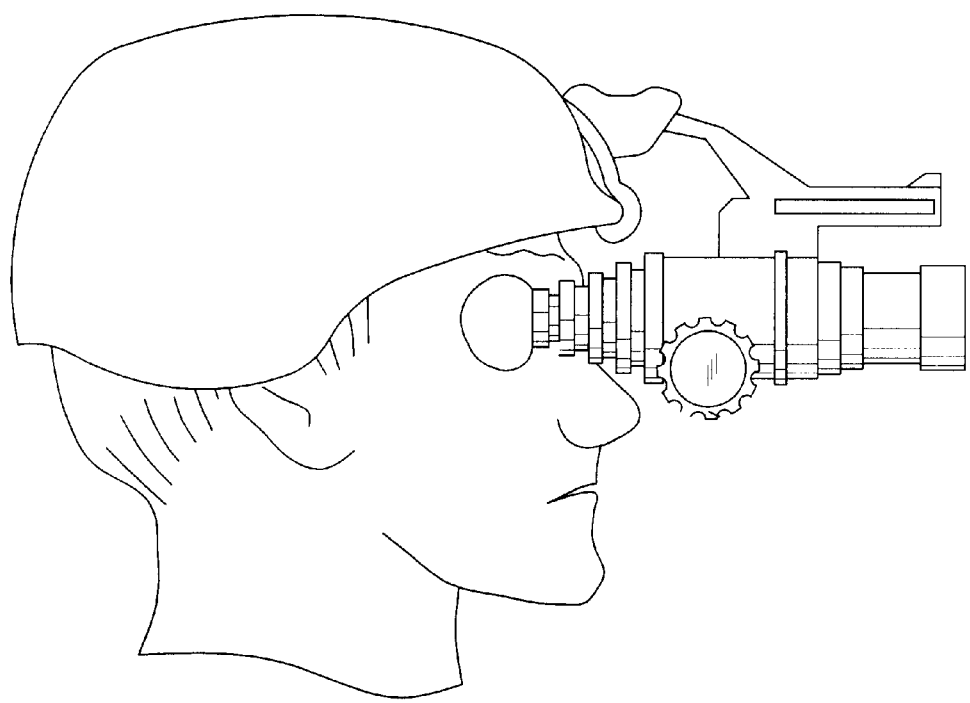
FIG. 2A shows a helmet mounted version of a direct view night vision goggle of the prior art.
Figure 2B:
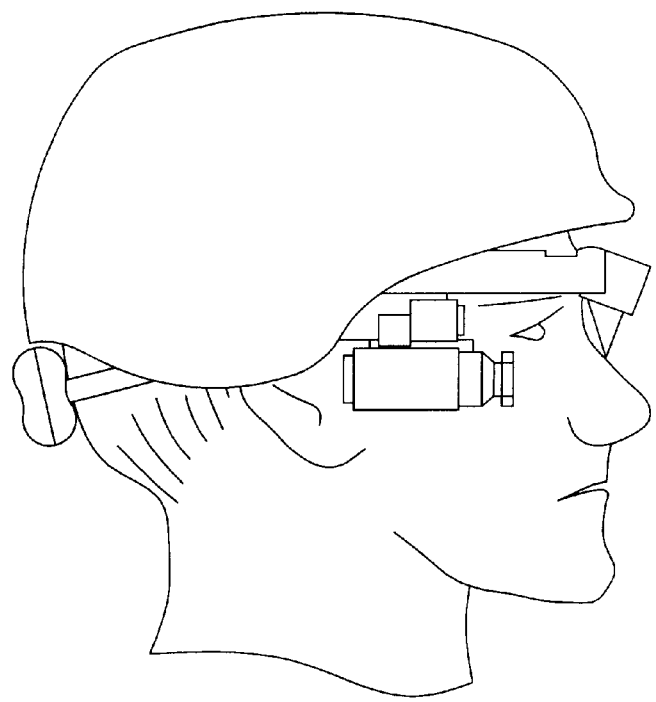
FIG. 2B shows a helmet mounted version of the present invention.

FIG. 2A shows an example of a prior art, direct view helmet mounted night vision goggle, while FIG. 2B shows a helmet mounted version of a night vision goggle according to the present invention. The specific components of the configurations of FIGS. 2A and 2B are similar to the components of FIGS. 1A and 1B respectively. Again, the advantages of the configuration of the invention are clearly evident.

Figure 3A:
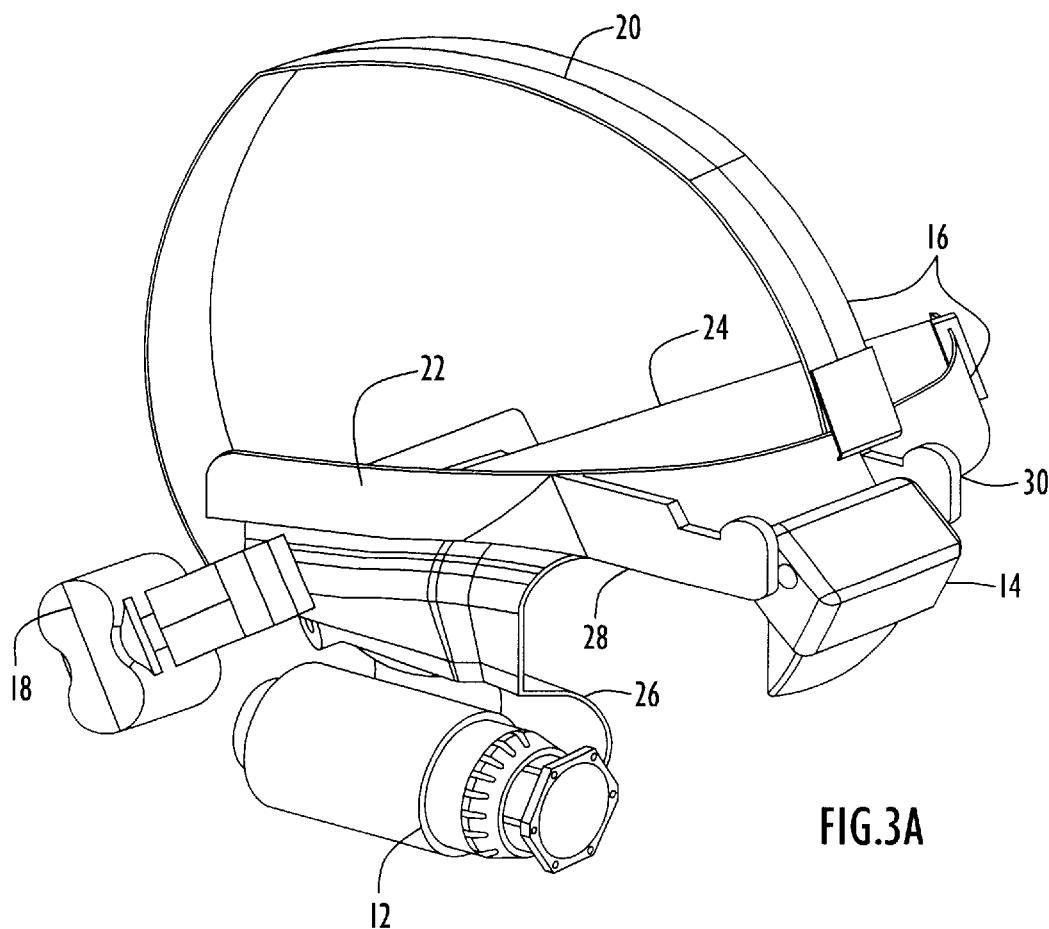
FIG. 3A shows the embodiment of FIG. 2A when not being worn.

Referring to FIG. 3A, which shows the same device as FIG. 1B, it is seen that the device may include a head mount assembly 16 and self-contained power supply module 18, for example, a battery pack. The head mount shown in FIGS. 1B and 3A is an assembly comprised of strap 20, mounting platform 22 which extends across the forehead and also includes a camera mounting portion 26, as well as nape strap 24 which extends across the back of the neck. The battery pack module 18 may be secured to the nape strap. Although not as preferred, the head mount may also be a helmet, as depicted in FIG. 2B.

In the embodiment of FIGS. 1B and 3A, display mounting extensions 28 and 30 extend from platform 22 for mounting the display therebetween. The mounting hardware is preferably arranged so as to provide maximum adjustability of the display position (e.g. three degrees of freedom). The display may be further arranged so it can be easily "flipped", out of the user's line of sight, and flipped back, without disturbing individual adjustments, or the optical alignment of FIG. 6.

Figure 3B:
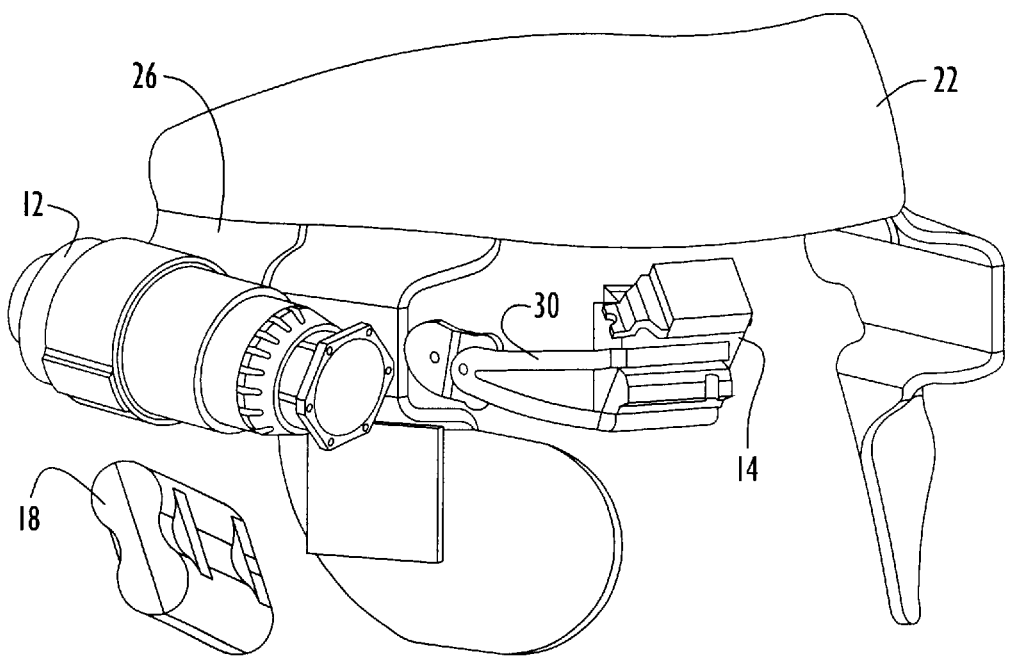
FIG. 3B shows an alternative embodiment.

An alternative head mount assembly is shown in FIG. 3B, which may have straps similar to the embodiment of FIG. 3A and strap mounting slots, (not shown). In FIG. 3B, mounting platform 22 which includes camera mounting portion 26 is shown, as well as display 14, which is adjustably supported by mounting extensions 28 and 30.

Figure 4:
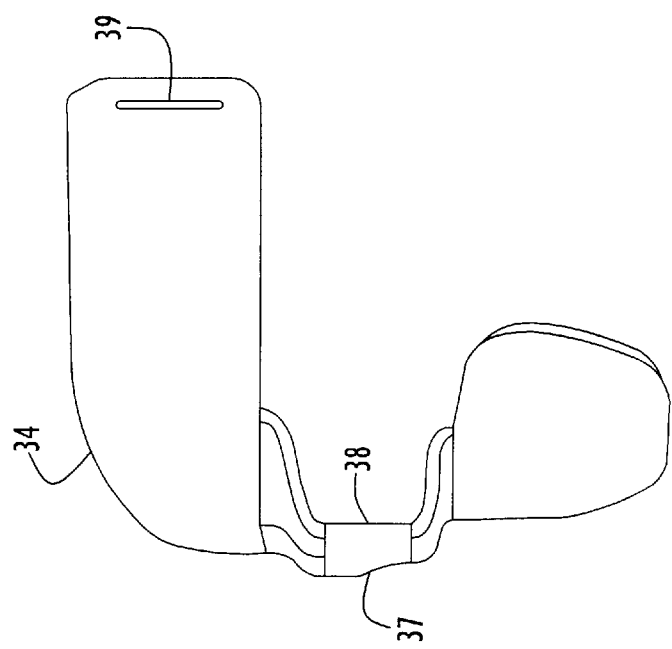

The mounting platform may be a padded, rigid structure or band to which the camera and display modules are attached. The straps secure the padded side of the mounting platform to the user's head. FIG. 4 shows an embodiment of a "mini-mask" type, of platform or forehead band 34, which is designed to be mounted on one side of the head, leaving the opposite side unencumbered. Camera mount support 37 is provided, which has recessed region 38 to provide clearance for eyeglass temples and earpieces. While the minifacemask has only a single area for mounting camera/ imagers, two cameras may be mounted here if they are small enough. Strap attachment slots 39 are for the attachment of mounting straps.

Figure 5:
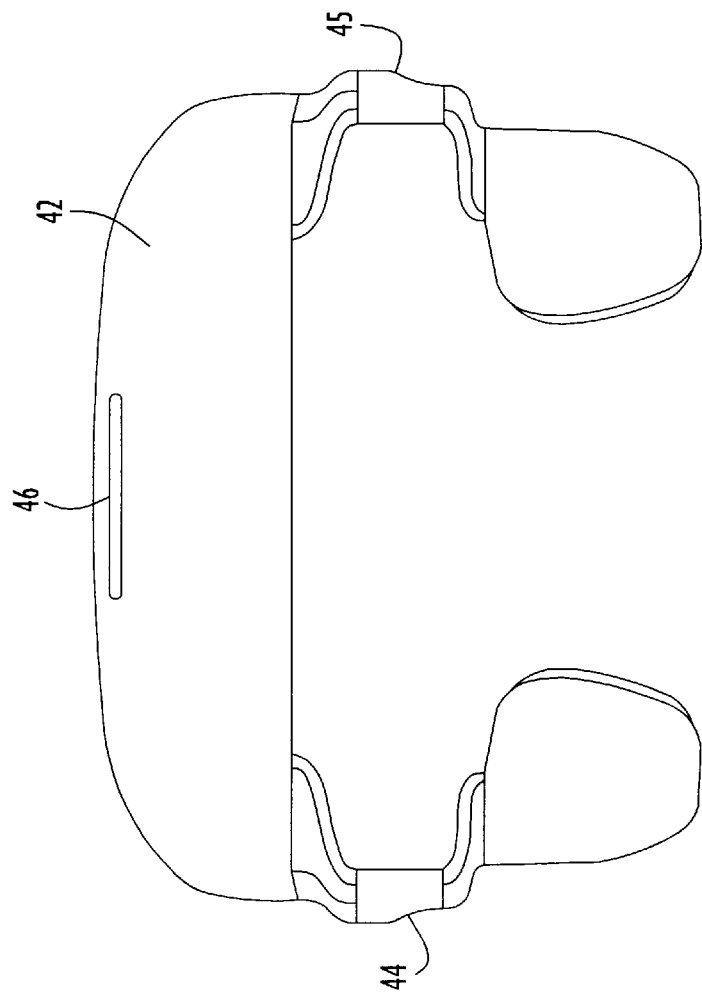
FIGS. 4 and 5 show embodiments of head mount platforms.

An embodiment of a full facemask is shown in FIG. 5. Both types of facemasks may be are fabricated using the same tooling and then secondary machined to become one of the two variants. The full facemask includes mounting platform 42, camera mount supports 44 and 45, and strap attachment slot 46. Thus, cameras may be mounted on both sides of the head, and a binocular system configuration incorporating two separate displays may be used.

The head mount straps may incorporate tightening buckles, located for example, where the head strap and neck straps are connected with each other. Also, the strap routing may be chosen to avoid sensitive "hot spots" on the head, thus minimizing user discomfort. The head mount assembly may perform a function in addition to holding the device system to the user's head. Thus, the battery module(s), connections, and power bus wires may be integrated into the straps. This is done to avoid snagging separate electrical wires which could occur if these wires were separate from the straps. Since the straps are secured to the surface of the user's head, the likelihood of snagging the straps or wires is minimized.

The battery pack contains the batteries that provide electrical power to the system The battery pack also contains a DC to DC converter which accepts the single voltage from the battery and converts it to several different DC voltages. These regulated DC voltages comprise the power busses for the electrical modules of the goggle system.

Figure 6:
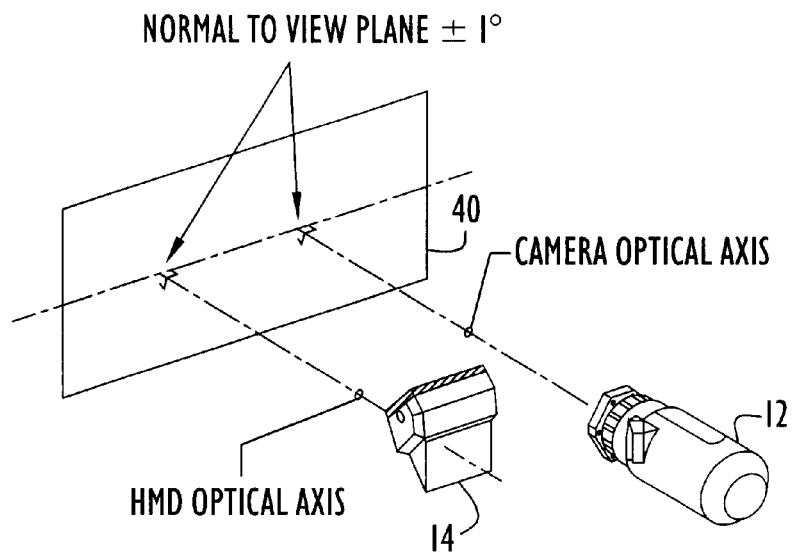
FIG. 6 shows how optical alignment is achieved.

The head mount platform/mask provides the mechanical means to align the optical axes of the camera and the display components. This optical alignment is shown in FIG. 6. This alignment provides an intensified image that appears at the same field angles to the user as would be the case if the device system were not being worn. This is to ensure that there is minimum deviation of the device image space with respect to the object space "real world." This is necessary because a fundamental purpose of the system is to provide a close visual simulation of the real world such that the user can intuitively perform common tasks such as walking and grasping objects. It is also necessary in those scene lighting conditions that provide enough light for the unaided eye to see a significant image. In this case, both eyes must perceive the same major shapes, in the same relative locations in object space, or binocular rivalry may inhibit the user's situational awareness rather than enhance it. As shown in FIG. 6, image intensified video camera 12 and the display 14 are oriented so that both of their optical axes are about normal to plane 40.

Figure 7:
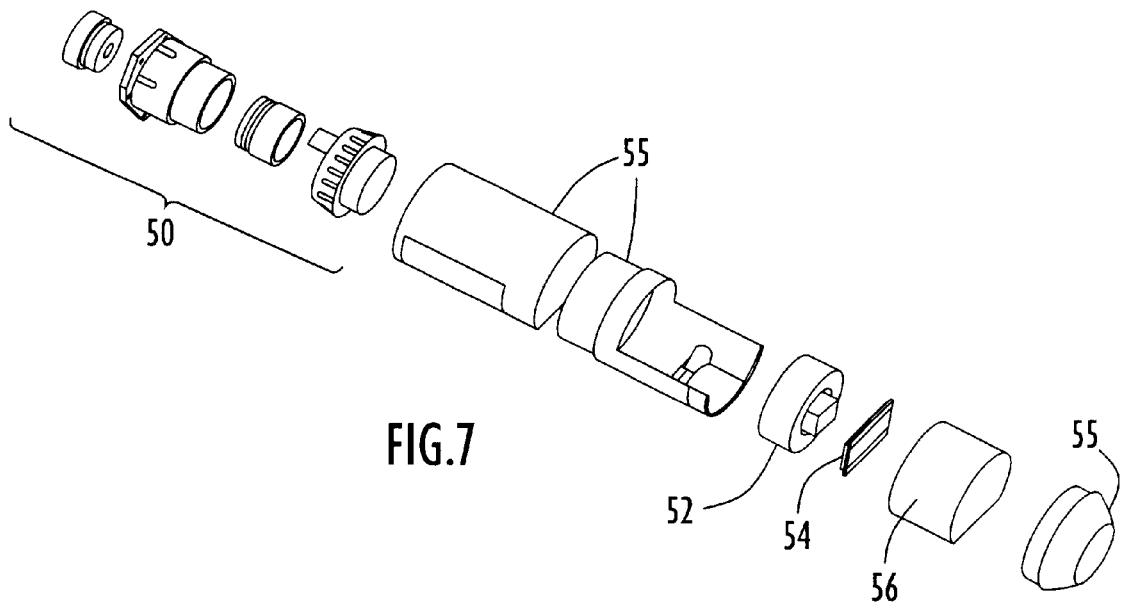
FIG. 7 is an exploded view of an image intensified video camera module.

FIG. 7 is an exploded view of the components of an image intensified camera module. These components are the objective lens assembly 50, the image intensifier tube 52, the imaging array 54, the high voltage power supply (HVPS) 56, and the camera housing 55. The objective lens provides a focused image of a low light level scene to the image intensifier input surface (the photocathode). The image intensifier is powered by the HVPS. The image intensifier amplifies the faint image at its input and reproduces a brighter version of this image on its output surface. This image is coherently transmitted to the electronic imaging array by the use of a fused fiber optic bundle. The imaging array, which may for example be of the CMOS or CCD type, senses the now intensified image and creates a real time video signal that contains a rendition of the image. The camera module thus receives electrical power and a low light image and outputs a video image of the low light level scene.

Figure 8:
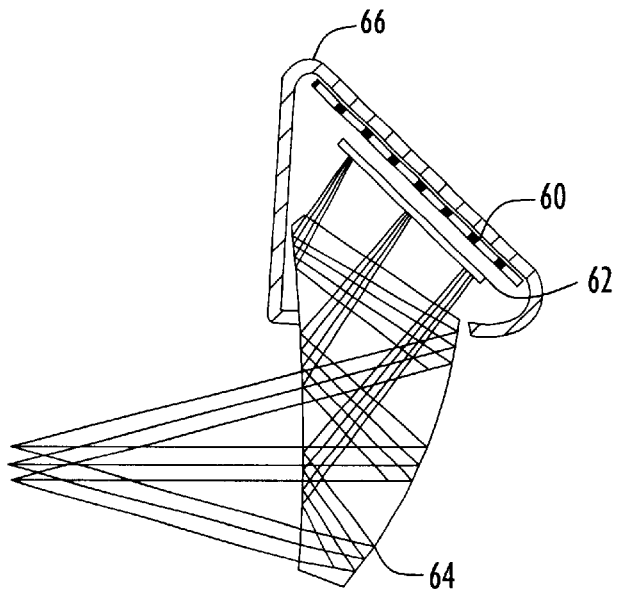
FIG. 8 shows an embodiment of a head mounted display assembly.

The video signal is fed to the display module. The display module, which may be referred to as a head mounted display 60 (HMD), presents the video image to the user's eye. An embodiment of an HMD 60 is shown in FIG. 8, which is a cross sectional view of the display module that illustrates the image light path as well as the relative position of each component. The video signal is received by the display printed circuit board 60. The printed circuit board, also receives DC voltages from the device power bus. The printed circuit board, which may be considered a driver, outputs electrical signals to the flat panel display 62, which converts the signals into a two dimensional video image. The flat panel display is of the microdisplay type, which typically measure less than 1.5 inches diagonally. Microdisplay technology offers three types of displays, all of which use flat panels which are small and relatively light in weight. These are the emissive type, the reflective type, and the transmissive type. All of the displays are electrically operated in that they require electrical input signals. An emissive type is preferred for the present application since they offer the smallest package and consume the least power, although reflective and transmissive types displays are encompassed herein. Emissive displays include electroluminescent displays, vacuum fluorescent displays, field emissive displays and OLEDS (organic LED's). As the name implies, the emissive source emits light and does not require a separate light source. The video image on the display is viewed by the user with aid of a prismatic eyepiece 64. This eyepiece optic is needed to present the video image as if it were at a significant distance (optical infinity) so that the user's aided eye can focus for this distance. The prism is placed in front of the user's eye, just beyond where a lens from a pair of glasses would be located. The prismatic eyepiece performs its optical function by internal reflections within the prism off surfaces whose curvatures produce the requisite optical powers which, in combination, make the display image appear at infinity. A particular prismatic eyepiece which may be used is disclosed in U.S. Pat. No. 5,701,202, which is incorporated herein by reference. The components are held in relative position to one another, and are protected from the outside environment, by the display housing 66.

To achieve the small size and low forward projection required for the device, the display module physical architecture is important. The prismatic eyepiece described above is a single optical element which replaces a multi-element conventional eyepiece. The prismatic optical path provides optical folds using sophisticated, non-spherical power surfaces.

The light path is folded so the display screen is located above the prismatic eyepiece, rather than in front as it in the coaxial layout. Another advantage is that the prismatic eyepiece can be made of plastic instead of glass as in conventional eyepiece elements. Optical plastics have ½ to ⅓ of the density of optical glasses. When this is combined with the fact that only a single prism element is used, the savings in weight and volume are significant.

When head mounted and in operation, the video goggle of the present invention replaces the prior art optical goggle. The basic system is a monocular system and presents the intensified video image to one eye of the user. The other, "unaided" eye is also directed at the scene in front of the user. The display presents the intensified image such that it appears to overlay the image perceived by the user's unaided eye. A binocular system is also within the scope of the invention.

Figure 9:
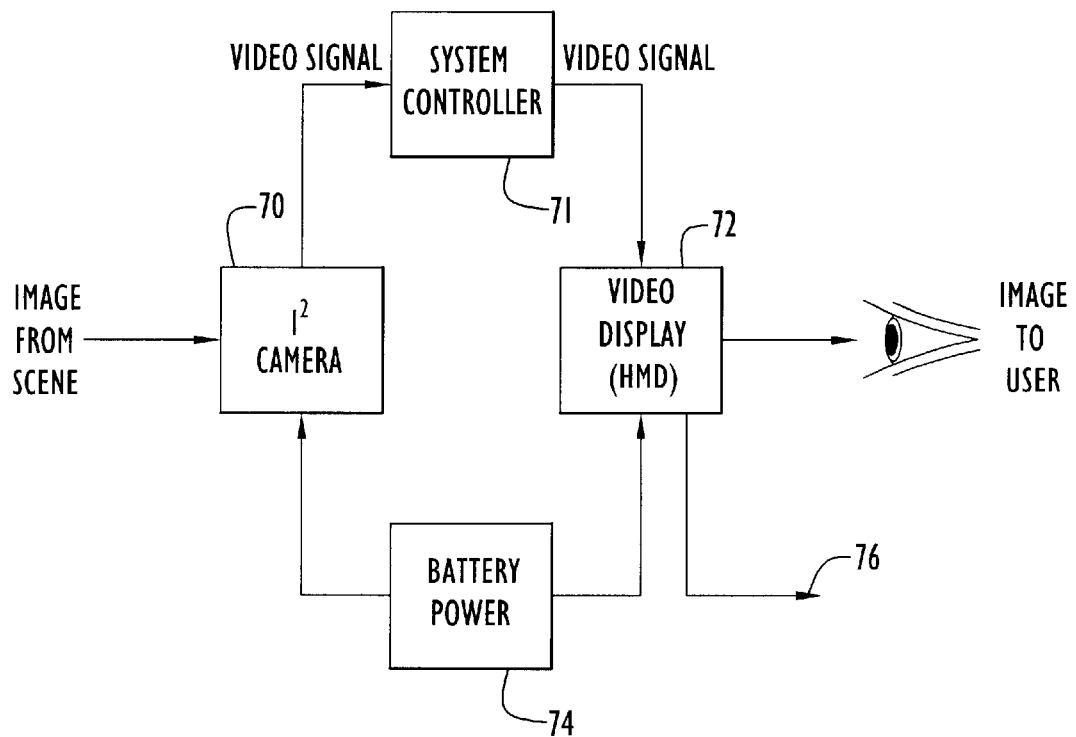
FIG. 9 shows an embodiment of a basic video enhanced night vision goggle.

A basic embodiment of the electro/optical system of the present invention includes an image intensified video camera, a display, and a power source. FIG. 9 shows a functional block diagram of the basic embodiment. The image intensified camera 70 senses light from the scene and creates a real time video signal that contains an electronic image of the scene. This video signal is transmitted to the video display module 72, which receives the video signal, and generates a two dimensional image that can be viewed by the human eye.

The basic embodiment may include a system controller 71 between the camera and display. The system controller may contain a micro-processor, FPGA logic gates, and RAM. It receives the video signal from the camera, which it also controls. It reformats the video data with an on-board program and transmits the "processed" video data to the digital display. The system controller is inherently flexible since it is a programmable device.

The image intensified camera, the system controller, and the video display blocks receive electrical energy from the power source 74, which may be comprised of batteries. The input to the system is the image scene light, while the primary output is the intensified image scene presented by the display and viewed by the user. Also note that an electrical video signal is available at output 76 (which may be a connector) as an optional output of the basic architecture.

The invention preferably uses a modular building block approach wherein each separate physical and functional unit is a self-contained module. For example, in such an approach the image intensified camera, the video display and the battery pack would each comprise a separate module. The advantage of this approach is that different combinations of operational capabilities may be provided depending on the selection of modules.

Figure 10:
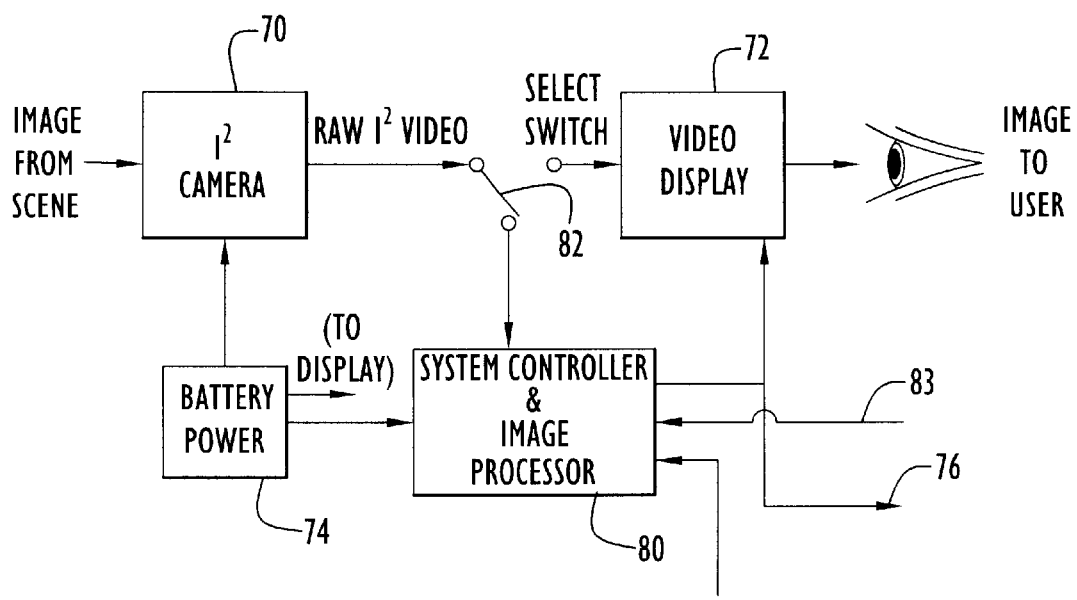
FIG. 10 shows an embodiment which incorporates image processing.

FIG. 10 shows a further embodiment of device functional architecture. It contains the same functional blocks as the basic embodiment shown in FIG. 9 with the addition of an image processor module 80 which may also contain the system controller. Also, selector switch 82 provides for switching the image processor module out of the system. As with the basic architecture, the input to the system is light from the scene being viewed, and the output from the system is an intensified video image of the same scene. The camera subsystem generates the "raw" (unprocessed) video signal. This signal is connected to either the image processor module or directly to the video display module. The user makes this selection via the selection switch 82.

The image processor module 80 provides the capability of performing real-time image processing of the video signal for the purpose of enhancing the picture presented to the user. Such enhancements may include but are not limited to contrast stretching, edge detection/enhancement, MTF peaking (aperture correction), integration, mixing/overlaying of intensified video with externally input video, averaging, and other known image processing functions. The provision of a video enhanced night vision device allows these functions which provide improved imaging and a degree of flexibility which are not found in the prior art direct optical view type of night vision goggle. An input 83 for user control of the image processor is also shown.

Figure 11:
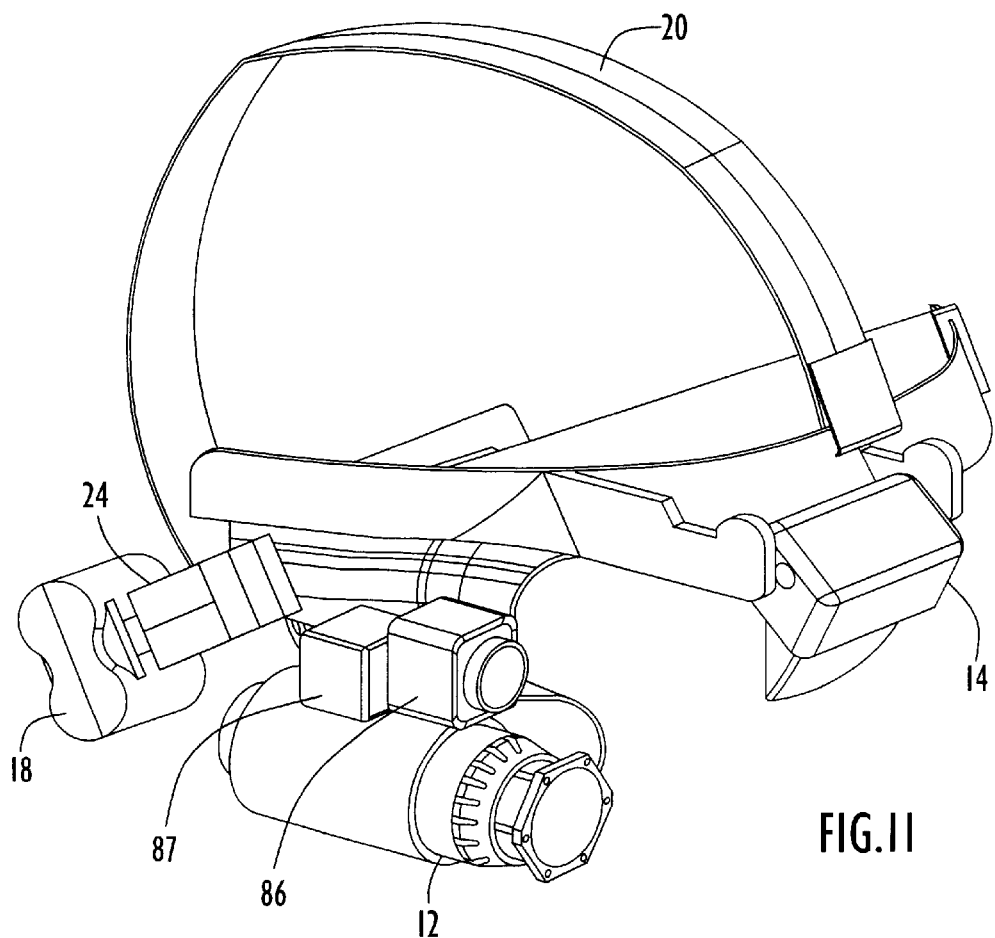
FIG. 11 shows an embodiment of the invention which incorporates both image intensified video and thermal camera modules.

A further embodiment of a night vision goggle in accordance with the present invention is shown in FIG. 11. In this embodiment, a thermal imaging camera 86 is added to the basic embodiment depicted in FIG. 3, and image processing module 87 is also shown.

Thermal imaging cameras are responsive to different portions of the infrared spectrum than image intensification devices, and thus provide additional information to the viewer. An advantage of the present invention over prior art direct view optical video night vision goggles is the ability to provide thermal imaging.

In accordance with an embodiment of the invention, the image from the thermal camera may be "fused" with the image from the image intensified camera, so that the viewer sees the two images superimposed on each other. FIG. 11 shows image processing module 87 which is capable of effecting the fusion, and FIG. 12 is a block diagram of the electronic system therefor.

Figure 12:
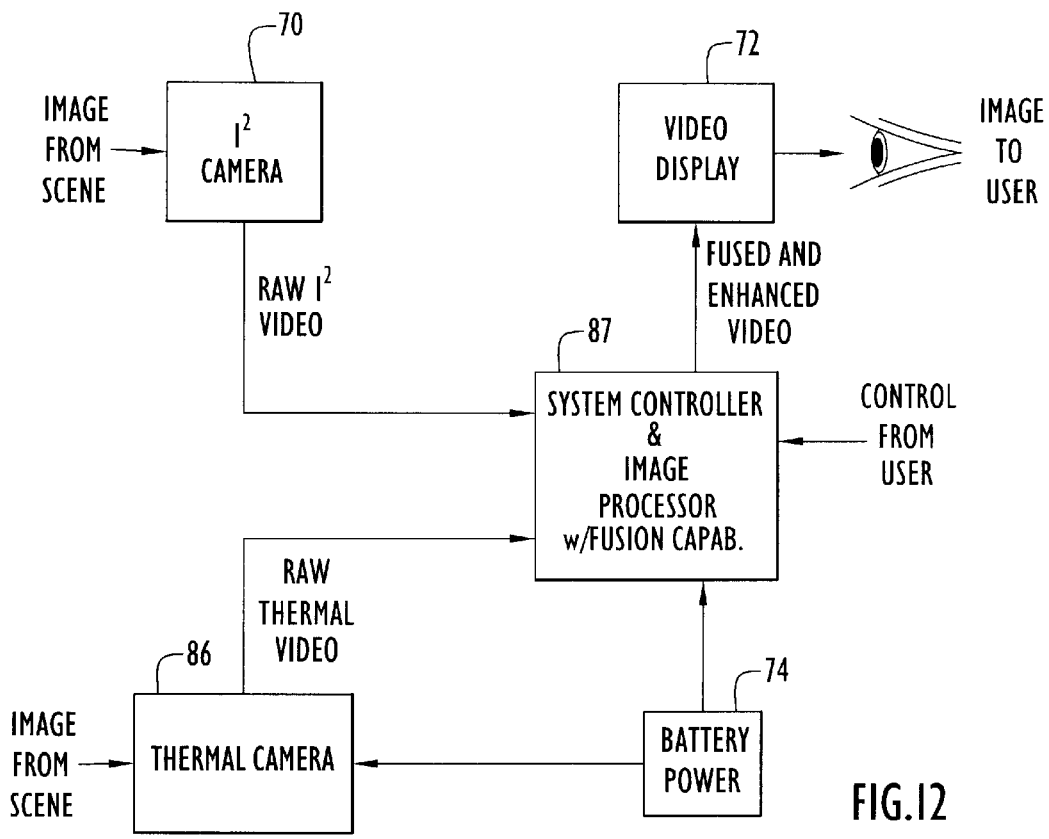
FIG. 12 is a block diagram of an embodiment which utilizes image fusion.

Referring to the FIG. 12, the unprocessed camera and thermal camera video signals are fed to the image processing block 87 having fusion capability. The image processing block 87 may include the same image enhancement functions previously described, and also includes the image fusion function. The image fusion function electronically overlays the two video images, adjusts their relative brightnesses, and may also add color cueing information. The fusion and image enhancement functions are both controlled by the user via physical controls on the goggle. The video display presents the video image that is the result of the enhancements and fusion processing. All electronic subsystems in this scheme are powered by a common system battery and DC-to-DC conversion function provided by the same supply module. Further details of the electronic fusion process are hereinafter discussed in connection with FIG. 19.

Two light wavelength bands which may be used are the 400-nm to 900-nm band (for the image intensifier) and the 8 $\mu$m to 12-$\mu$m band (for the thermal camera). The thermal camera may be based on an uncooled focal plane array (FPA) and incorporates its own objective lens, which is designed to provide a thermal video field of view that is essentially the same as the field of view of the $I^2$ camera. The optical axes of the thermal and $I^2$ cameras are aligned parallel during assembly of the system to simplify the processing task of fusing the two video images by overlaying the two video signals of a common scene.

The details of an embodiment of the image intensified video camera will now be discussed. Because the present invention relates to a head-mounted application, it is desirable to minimize the size of the camera module. Additionally, the operating characteristics of the camera must be adequate to provide the quality of video imagery that will afford the enhanced situational awareness. To achieve these goals, the camera design may incorporate features, including the use of a 16-mm intensifier tube, a gated high voltage power supply (HVPS) which may be smaller than that used in stationary applications, and small, low power electronic imaging circuits.

Figure 13:
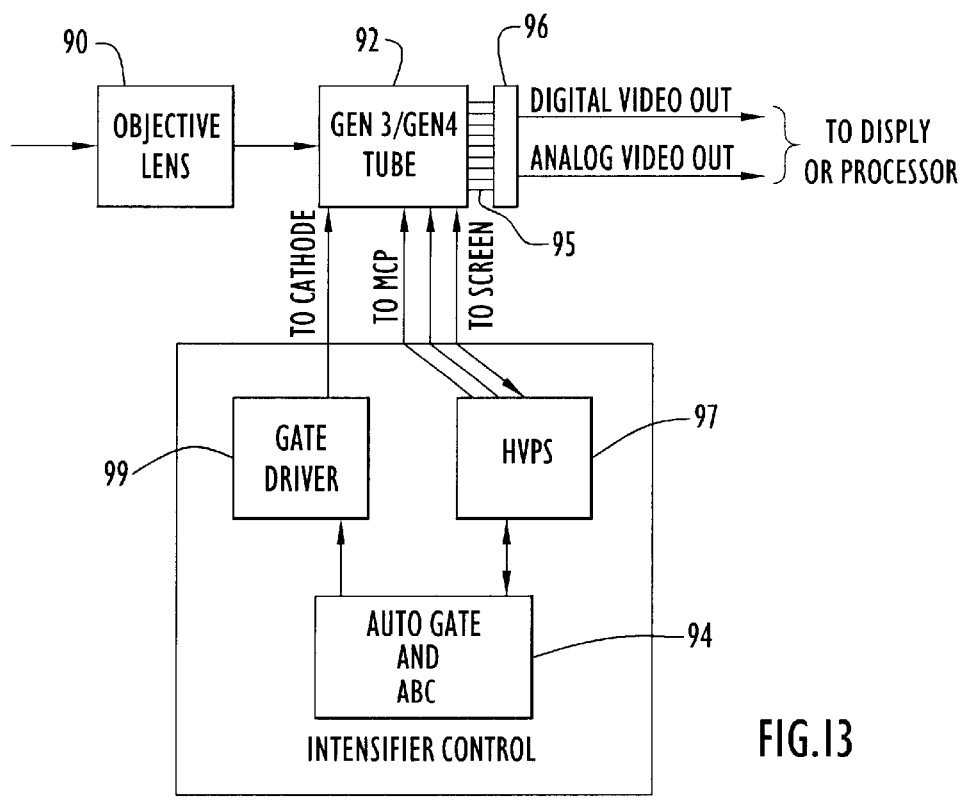
FIG. 13 is a block diagram of an image intensified video camera and basic power supply.

FIG. 13 shows an embodiment of basic functional architecture for an image intensified camera module. In this architecture, the objective lens 90 focuses light from the scene onto the photocathode of the image intensifier 92. The tube also contains a microchannel plate (MCP) for amplifying electrons and a phosphor screen having a screen optic 95. The image intensifier is preferably a late model version such as a Generation III, Generation IV, or later model when such becomes available. The tube is powered by an auto-gating HVPS 97. The auto-gate 94 controls the HVPS 97, which supplies voltage to the microchannel plate and screen, and also controls the gate driver 99 which supplies the cathode voltage. The auto-gating allows for operations into higher light levels than is possible with a conventional, non-gated wrap-around type HVPS. In the present architecture, the control loops that determine microchannel plate voltage and gate duty cycle may be integral to the HVPS. Auto-gate block 94 includes an automatic brightness control function (ABC), which truncates the linear gain characteristic of the tube and effectively sets a maximum brightness output. To provide a properly exposed and adequately bright image from the intensifier tube, the control circuits automatically optimize the screen luminance from the tube. This image from the image intensifier is fiber optically coupled by screen fiber optic 95 to the imaging chip 96. As an example, FIG. 13 shows a CMOS "camera-on-a-chip" at this position in the architecture, although other solid state imaging arrays could also be used. For example, a CCD chip with its associated camera printed circuit boards could perform the same function as the CMOS camera.

This CMOS camera functional block has the purpose of sensing the 2-D image on its pixel array and generating a real-time video signal representation of that image. Integral to this integrated circuit is the camera automatic gain control (AGC) function. This control loop has the purpose of adjusting effective camera gain so the video signal image has optimum intra scene dynamic range at any given time. The AGC loop may be integral to the CMOS camera-on-a-chip, so this control loop is not shown in FIG. 13. Depending on specific type, the CMOS camera may output digital video, analog video, or both signals.

The basic camera architecture shown in FIG. 13 has two independent control loops. The tube gain/gating loop operates as in a direct view system and receives feedback signals only from the tube. The CMOS camera subsystem has its AGC loop effectively operating independently of the tube/power supply. For the overall camera to operate in a suitable manner, it is necessary to ensure that the time constants of the two independent control loops are significantly different. Failure to do so will result in a positive feedback condition with the probable result being a total loss of useful video imagery.

Figure 14:
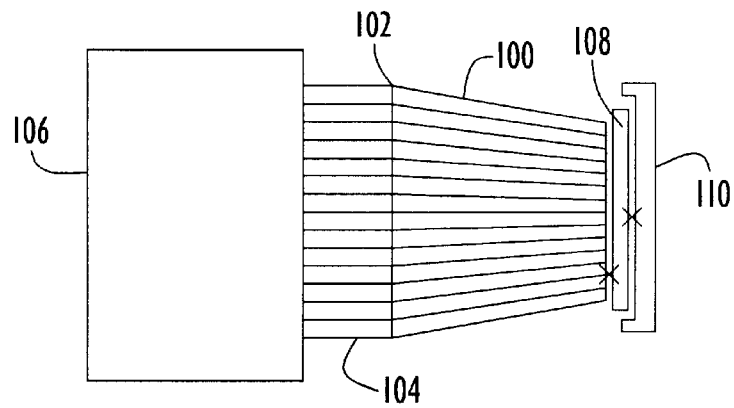
FIG. 14 is a cross sectional view showing a fiber optic taper for connecting an image intensifier tube with an imaging array chip.

FIG. 14 shows a cross sectional view of the tube/taper/image chip physical architecture. The fiber optic taper, or minifier 100, is optically bonded to the flat 102 of the screen fiberoptic 104 of image intensifier tube 106, The small end of the taper, with its minified image, is bonded to the IC imaging array chip 108 which is itself bonded to the chip carrier 110. In this manner, the intensified image present on the tube screen is coherently transferred and scaled to the array. If the array is used with a diagonal dimension close to the tube imaging format diameter, the fiber optic taper can be eliminated, and the solid state array can be bonded directly to the tube screen optic.

Figure 15:
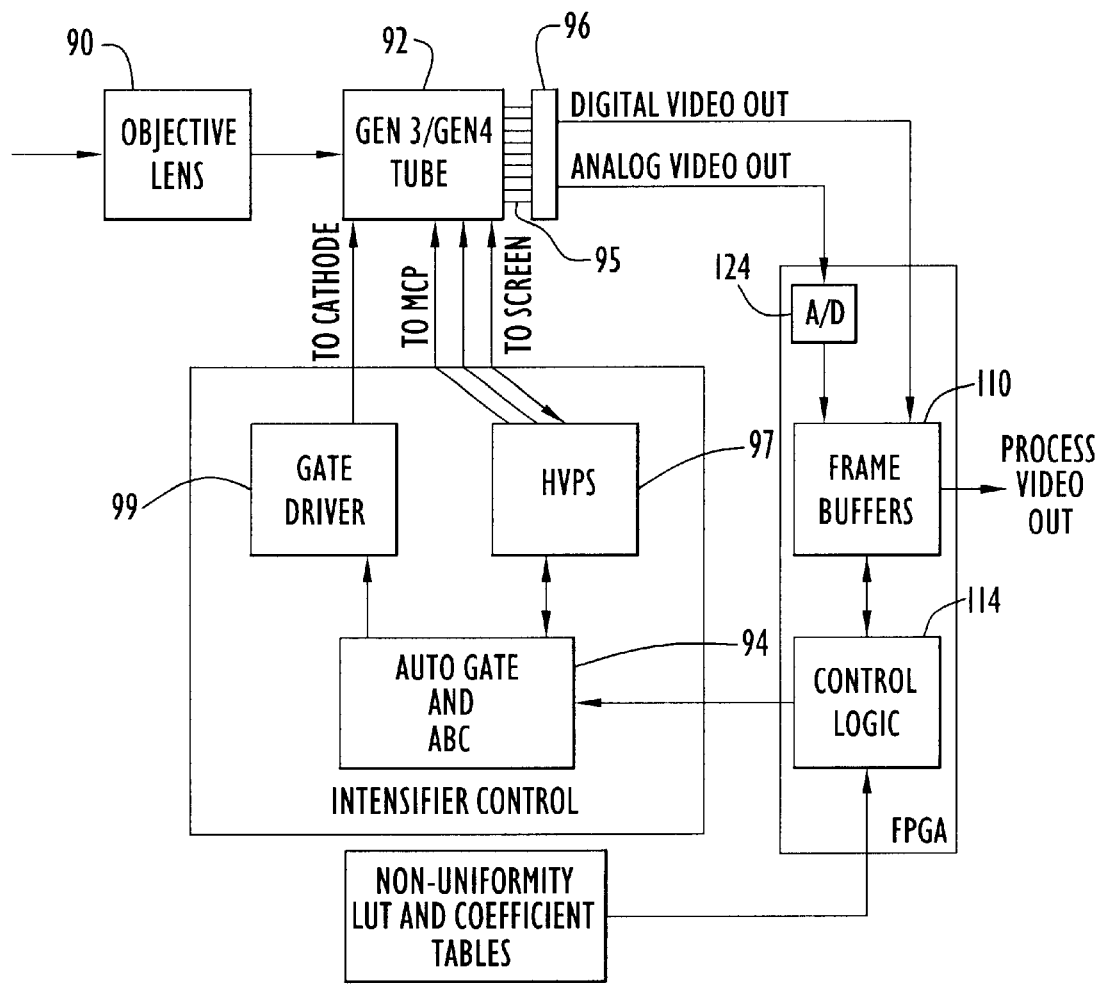
FIG. 15 is a block diagram of an image intensified video camera and advanced power supply.

FIG. 15 shows a further embodiment of a camera controller which has additional control functions. In this embodiment, the tube cathode duty cycle, the MCP voltage, and the camera AGC are automatically controlled. Unlike the prior embodiment, the control loops in the embodiment of FIG. 15 are designed to work together in an integrated manner to optimize overall camera performance. In FIG. 15, the gating is arranged to switch the full cathode voltage typically (600 to 1000 volts) rather than the smaller swing (typically 200 volts) allowed by the basic embodiment. This requires a larger, more capable, and more complex HVPS. The available duty cycle of the cathode gate is also greater. The actual duty cycle range depends on the specific design, with the shorter duty cycles requiring larger packages.

The embodiment of FIG. 15 is also capable of applying a variable voltage to the microchannel plate (MCP) and consequently changing the intensifier gain over a wide range. Unlike the basic system architecture, however, the control of the gate duty cycle and MCP gain is not integrated to the HVPS. The duty cycle and tube gain are set in response to both the tube screen voltage and the video average picture level (APL).

As seen in FIG. 15, there is a bidirectional arrow connecting the tube screen with the HVPS. The indicated control loop optimizes the tube screen luminance, but this is a minor loop within the overall camera exposure control scheme. As seen in the Figure, there are real time video signals output from the "camera-on-a-chip" subsystem. These signals go to the frame buffer 110. The FPGA control logic 114 is able to use this buffer information to perform the camera exposure optimization function. The APL is easily calculated from the data in the buffers, and this acts as the feedback signal in this control loop. Depending on the APL, the control logic can select the MCP gain and gate duty cycle that best exposes the video images. The control loop is closed by the connection between the FPGA control logic and the Auto Gate block. Logic within this block performs the local control of the simultaneous MCP and gate duty cycle operation.

The control scheme of FIG. 15 allows the camera to generate useful video over 7–8 orders of magnitude of scene illumination. This is an important feature for hands-free, automatic operation. The key to the scene brightness tolerance is the integration of the duty cycle, MCP gain, and camera AGC gain. When properly implemented, this control scheme also optimizes camera MTF/resolution for a given light level. By selecting a duty cycle and gain settings that minimize noise and avoid saturation, the best possible camera performance for a given condition can be achieved.

The FPGA programming also implements another subroutine that distinguishes the advanced architecture from the basic design. The FPGA allows for compensation of subtle non-uniformities in the imaging array. This also improves the overall MTF and quality of the image from the camera. The non-uniformity look up and coefficients tables 116 are fixed data sets that are stored in memory. If effect, this data defines the fixed gain non-uniformity of the array as well as any fixed pattern noise. The control logic block 114 is able to "subtract" these artifacts from the image data in the frame buffer resulting in an improvement of the image quality.

The camera controller depicted in FIG. 15 is found in prior art night vision goggles. A miniaturized version of the controller is particularly useful in the video enhanced goggle of the present invention. Although not shown in FIG. 15, additional control paths are feasible in the advanced architecture, depending on the design of the CMOS camera-on-a-chip subsystem. The most fundamental of these is camera AGC. In some applications another minor loop could be closed between the control logic in the FPGA and the CMOS camera. This would allow explicit control of camera electronic gain and, if properly integrated, would provide additional signal-to-noise ratio and MTF optimization.

Additional functions such as saturation protection and custom shuttering can also be designed into the camera-on-a-chip, which can be integrated with advanced control logic in the FPGA. The additional performance capabilities that this provides are classified under the general topic of image enhancement.

The image processing subsystem within a video enhanced night vision device may physically be comprised of dedicated electronic circuits. Such a subsystem is shown as the "image processor" block in FIGS. 16 and 17. As seen in these Figures, the processor receives the raw video signal from the camera subsystem, and sends the processed video signal to the display. The specific function(s) to be performed by the image processing block may be selected by the operator. Thus, the controls for the processor may be located on the exterior of the device. Access to image processor functions can be provided with a single, momentary switch. The switch may be arranged so that each switch closure displays the name of a successive function in the upper right-hand corner of the video display. If the user desires a particular processing function, he can simply let the function displayed time out (in 3–5 seconds) and that function will be automatically implemented. Successive closures of the switch (e.g., a button switch) will cycle through the available functions. To turn off all image processing options the user may cycle through to the "No Processing" option in the menu.

Figure 16:
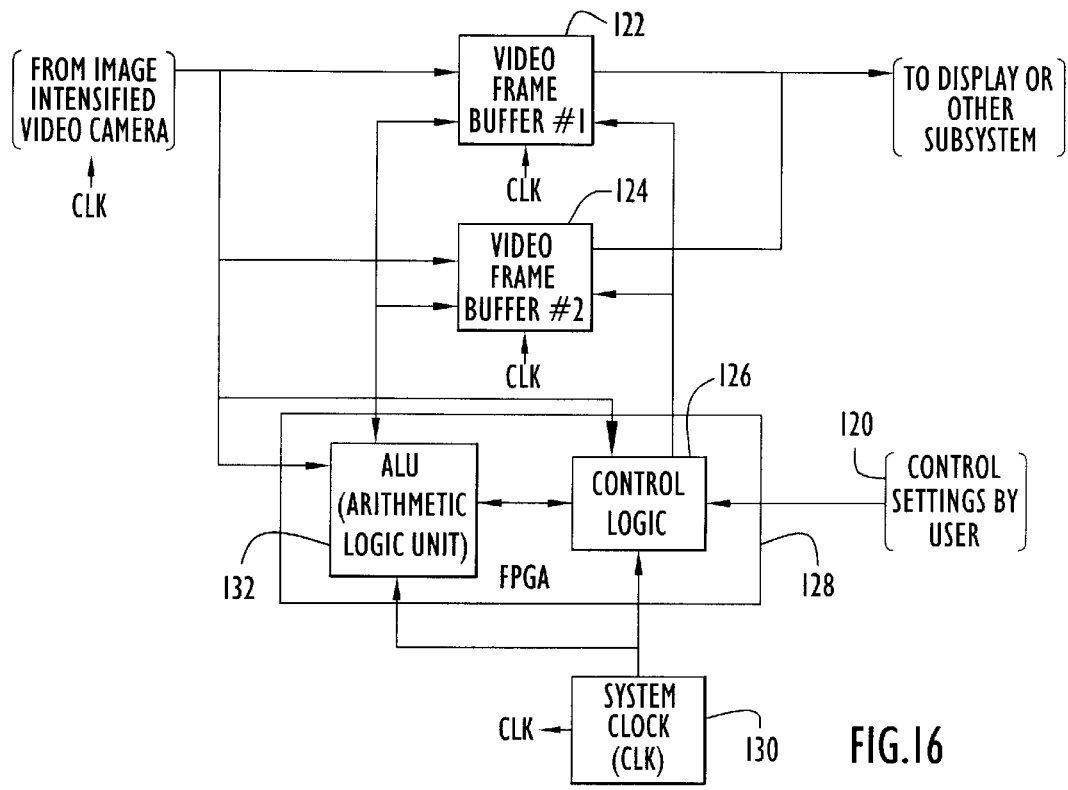
FIG. 16 is a block diagram of an embodiment of an image processor.

FIG. 16 shows the functional architecture of an embodiment of the image processing module subsystem. This figure illustrates the blocks that reside within the "image processing" block of FIG. 10. The input to this block is the digital video signal from the camera subsystem.

As the data stream is sent to the image processor subsystem, it is written directly into one of the two video frame buffers 122 and 124. This writing process is managed by the control logic portion 126 of the field programmable gate array (FPGA)128. The FPGA is a flexible, programmable integrated circuit that incorporates several functions found on computer processors.

The control logic manages the overall timing and operation of the image processing subsystem by monitoring the timing information embedded in the input video stream and by monitoring the system clock 130. The clock provides clock signals (CLK) to the FPGA control logic, the frame buffers, and to the camera subsystem. This master timing signal is needed to properly synchronize the overall video signal train and ensure that image processor doesn't lose image frames or otherwise corrupt the system timing.

The arithmetic logic unit (ALU) 132 within the FPGA performs the actual image processing operations. The frame buffers are loaded with image data in the form of numerical values that correspond to pixel brightness values. The fundamental principle of image processing is to modify these values and produce an enhanced image for display. For each image processing function (contrast stretching, edge detection, etc.) there is a specific algorithm, or program, that must be performed. The control logic loads this program from a program RAM (not seen in FIG. 16) into the FPGA and uses the ALU to execute the algorithm. Essentially, the ALU numerically manipulates the pixel data in one of the frame buffers in accordance with the program logic. The specific image processing algorithms for different functions are well known to those skilled in the art.

The overall timing of the image processing subsystem is important. As a video frame from the camera is being written into one of the frame buffers, the other frame buffer is outputting a processed video frame to the display. To maintain a real-time video image for the user, the output video stream must consist of continuously updated, processed images. The control logic 126 manages this timing. Each frame buffer is thus alternately a receiver of data from the camera and a source of data for the display. This scheme is sometimes referred to a "ping pong" buffer because of the continuously alternating roles played by each buffer.

In addition to this input/output (I/O) activity, the control logic must ensure that the arithmetic processing of the video is completed properly. This is also done "on the fly" so that a processed frame of video data is ready in each successive frame time. The ALU typically performs this math on a video frame immediately after it is written into the frame buffer and prior to the start of frame transmission to the display. By maintaining this timing sequence, the image processor subsystem is able to supply real-time video data to the display.

Figure 17:
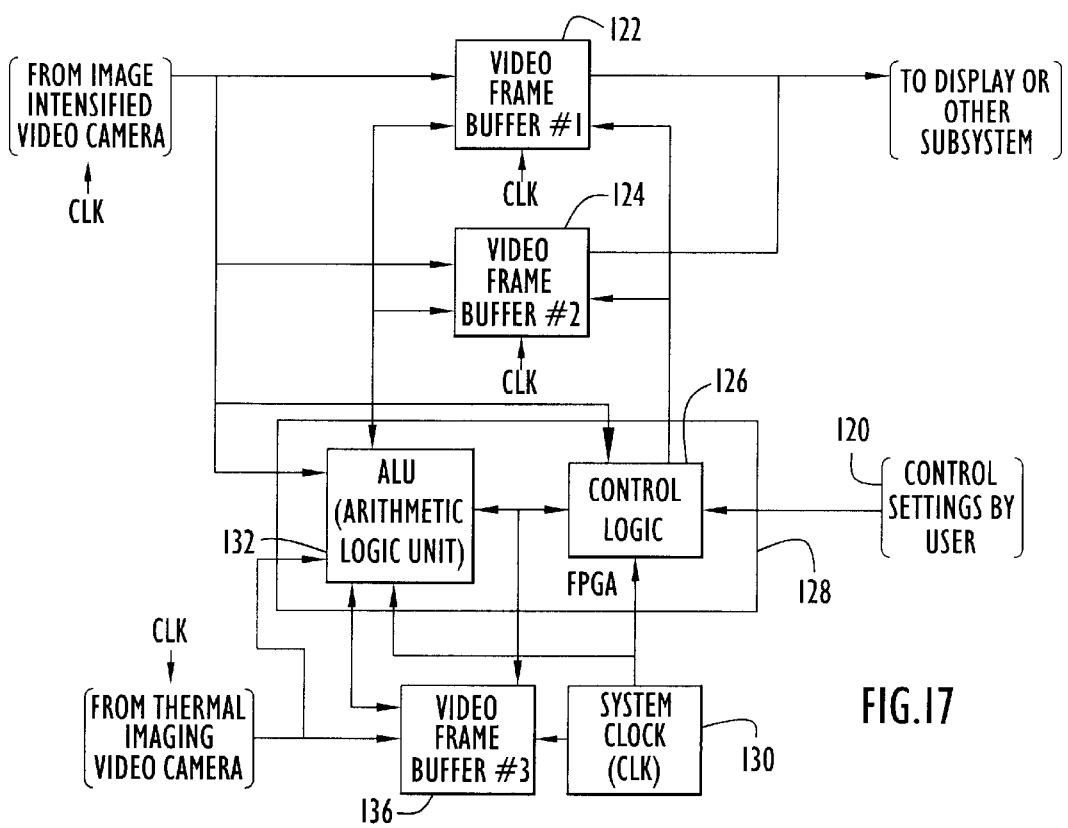
FIG. 17 is a block diagram of an embodiment of an image processor incorporating a fusion capability.

A primary goal of an embodiment which incorporates both an image intensified video camera and a thermal camera is to take the images from both sensor types and present their fused image to the user. Such a fused image will present the most salient details available from each sensor in a manner that will enhance the user's situational awareness without adding to sensory overload. Image fusion will allow the user to detect a camouflaged person or a vehicle from its thermal signature and then employ the intensified visible spectrum to recognize and identify these potential threats. For image fusion, the basic architecture of the image processor system shown in FIG. 16 can be modified with an additional frame buffer 136 as shown in FIG. 17.

Frame buffer 136 serves as the initial storage memory for the thermal camera video stream. In one embodiment of a fusion processing scheme the "raw" thermal image data is then combined with the raw visible spectrum video from one of other frame buffers by the FPGA logic. This fused video image is created in the remaining frame buffer in accordance with a fusion algorithm and sent to the display from there.

An embodiment of an "entry level" fusion process is the "A+B", or additive fusion approach where the two video signals are summed and displayed as a electronic overlay of the two images. The relative brightnesses of the individual signals may be varied by the user such that any video image from full $I^2$ to full thermal video (or any combination in between), could be viewed. The architecture shown in FIG. 17 could easily support this approach with the appropriate control inputs from the user.

Refinements to the basic A+B algorithm are also possible with this architecture. For example, compensation for slightly different fields of view from the two cameras could be implemented with a look up table and the FPGA. Two dimensional "stretching" of the video image to achieve pixel by pixel overlay with another video image is also feasible, with each camera pixel mapping into several pixels in the frame buffer. This feature could be combined with a parallax correction algorithm that compensates for the image displacement caused by the entrance apertures of the two cameras being located in different places.

The advanced video enhanced night vision goggle device system with image processing is thus a logical building block that leads to a true electronic fusion night vision device. With the incorporation of a thermal camera and a third frame buffer as previously discussed along with the appropriate software, the advanced device is a fused goggle system.

A primary goal of the invention program is make the entire system head mountable while still preserving the soldier's ability to perform Individual Movement Techniques (IMT). In addition to being lightweight, minimizing forward projection, and avoiding off head cables, the system must be passably comfortable to the wearer. Thus, it is desirable for all sub-systems to be as small and light as possible.

The size and weight of the video camera is driven by the optics and the image intensifier tube. The use of a CMOS camera-on-a-chip minimizes the physical bulk of the camera electronics. In an actual embodiment, the size of the video camera assembly, including optics, tube, CMOS camera, auto-gating HVPS, and housing, is estimated to be about 87 mm long with a diameter of 31 mm. The estimated weight for such camera is approximately 150 grams.

The functional architecture of the image processor could require a significant number of integrated circuits (ICs). A conventional approach to building this subsystem would involve populating a multi-layer printed circuit board (PCB) with these ICs. An example of a common PCB that has similar complexity, size and functionality is a frame grabber/image processor board that is designed to go into an expansion slot in a PC. A PCB with this level of complexity can easily require 20–30 square inches of board area. This board would also require an enclosure to house it and protect it from the environment. A box this size would not be head mountable in any configuration that would enable the improved IMT required of the present device.

However, to realize a superior head mountable video enhanced device system with image processing, an electronic packaging approach other than conventional PCBs may be desirable. One possibility is the multi-chip module (MCM) approach. In this technology, the subsystem ICs are bought as unpackaged "chips" of silicon wafers on which the integrated circuit has been fabricated. These are sometimes referred to as dies or dice and are the active parts of all packaged ICs. The interconnections between dice are created at a much smaller scale than usually provided by the relatively large copper traces on a PCB. Several dice can be interconnected by a unique form of conductive film. These dice and the interconnects can by housed inside of a "chip carrier" package that looks like a large packaged integrated circuit, complete with external pins. The image processing subsystem and portions of the camera and display subsystems can be built of MCM's.

Alternative approaches to electronics miniaturization can also be used. For example, NeoChip stacking technology by Irvine Sensor allows the arranging of heterogeneous chips into a single stack, resulting in the replacement of a traditional PCB with a very small monolithic cube of electronics. The elimination of PCB's results in significant miniaturization of electronics while significantly improving the ruggedness of the electronics to withstand extreme environments (temperature, vibration, and shock) simultaneously.

Figure 18:
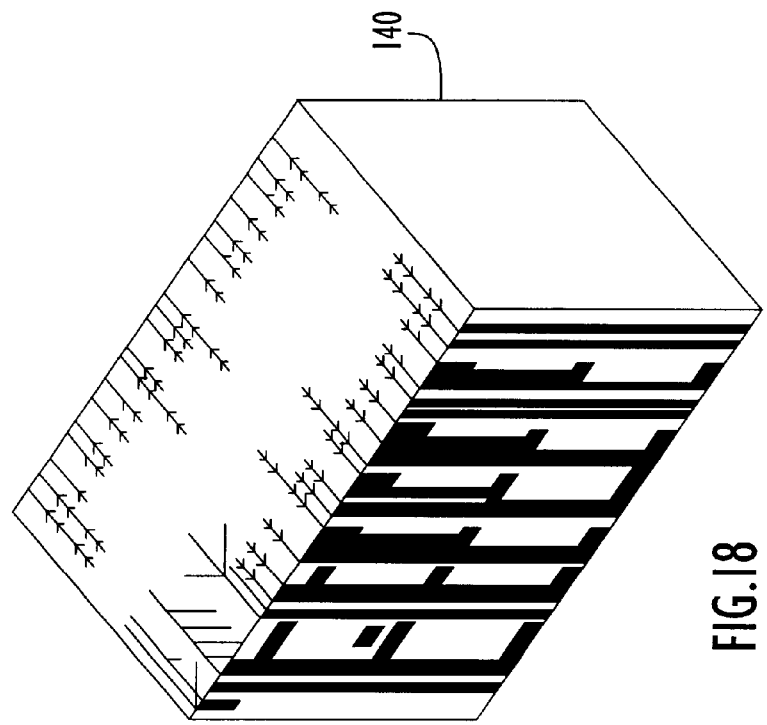
FIGS. 18 to 20 show miniaturization technology.
Figure 19:
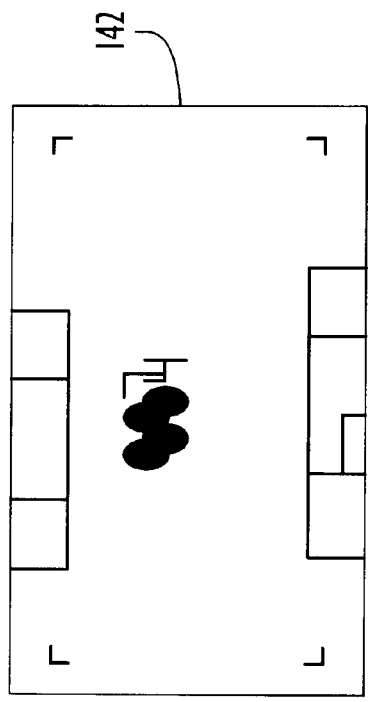
Figure 20:
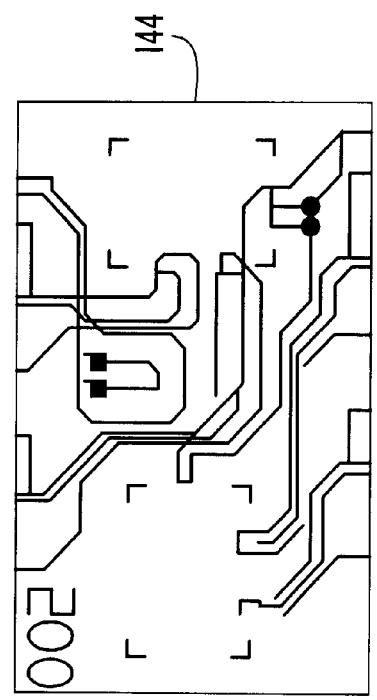

An example of such technology is shown in FIGS. 18, 19 and 20. FIG. 18 shows an integrated cube 140 (MCM or NeoChip) while FIGS. 19 and 20 show sample layers 142 and 144 of a NeoChip cube. Layer 142 is comprised of a single large chip with single layer metal, while layer 144 is comprised of multiple small chips with two layer metal. The complex Neo-stack design is a complete computer with 52 chips on 48 layers, using 10 different chip types. These include a processor, interface chips, DRAM, and 32 layers of flash memory of or mass storage, eliminating the need for a hard drive. All of this is an envelope that measures 0.8 inch×0.5 inch high. Also included in the stack are precision resistors and capacitors, fabricated on silicon and processed in the stack in the same way as a chip. The design demonstrates that complex embedded systems requiring a high level of interconnectivity can be designed as Neo-Stacks. This packaging technology provides the present device with the volumetric efficiency to successfully achieve the packaging volume and weight that provides a desirable head mounted system.

There thus has been disclosed a video enhanced night vision goggle device. It should be understood that while the invention has been disclosed in connection with illustrative and preferred embodiments, variations within the scope of the invention will occur to those skilled in the art. Thus, the invention to be covered is defined in the following claims.

We claim:

1. A man portable video enhanced night vision goggle device, comprising:
    a head mount adapted for being worn on the head of a user;
    an image intensified video camera secured to the head mount;
    a display comprised of an electrically operated flat panel and an optical eyepiece, which is secured to the head mount with a mounting means which is configured to enable placement of the eyepiece when the head mount is word by a user directly in front of the user's eye with both the flat panel and eyepiece being located forward of the user's eyes; and
    an electrical connection between the image intensified video camera and the display;
    wherein the head mount is comprised of mounting strap means and platform means to which the video camera and display are secured and wherein the mounting strap means and platform means are securable to each other.

2. The man portable device of claim 1 wherein the mounting strap means comprises a first strap for passing over the center of the user's head from front to back and wherein the platform means has a first portion which is adapted for placement across at least part of the user's forehead.

3. The man portable device of claim 2 wherein the platform means has a second portion extending from the first portion in such position as to be adjacent a user's cheek, wherein the first portion is for securing the display and the second portion is for securing the video camera.

4. The man portable device of claim 3 wherein the electrical connection is inside the strap means.

5. The man portable device of claim 4 wherein the mounting strap means further includes a second strap for passing behind the nape of a user's neck.

6. The man portable device of claim 5 wherein a self-contained power source is secured to the second strap.

7. The man portable device of claim 5 wherein the platform means includes a recessed region for providing clearance for a user's ear or eyeglass temple.

8. The man portable device of claim 5 wherein the first portion of the platform means is for extending substantially all the way across a user's forehead, and wherein the platform means includes a third portion extending from the first portion in such position to be adjacent a user's other cheek.

9. The man portable device of claim 4 wherein the first portion of the platform means is dimensioned for extending to an end which is only part way across a user's forehead, and wherein there is at least one strap attachment slot located near such end.

10. The man portable device of claim 4 wherein the display is pivotally mounted from projections which extend from the first portion of the platform means.

11. A night vision goggle device, comprising:
    a first mounting strap conformable to the shape of an arc for passing over the top of an observer's head;
    a forehead band attached to the mounting strap for extending at least part way across an observer's forehead;
    a mounting member extending from the forehead band at one side thereof having an image intensified video camera secured thereto; and a mount on the forehead band to which a video display module is secured.

12. The goggle device of claim 11 further comprising a second mounting strap for passing behind the nape of an observer's neck, a battery pack being secured to the second mounting strap.

13. The goggle device of claim 12 wherein means are provided for maintaining optical alignment between the video camera and the display.

14. The goggle device of claim 11 wherein the mount on the forehead band comprises a pair of mounting projections for pivotally mounting a video display module therebetween.

15. A man portable video enhanced night vision device, comprising;
   a head mount assembly comprised of a flexible mounting strap for passing over a user's head and a mounting platform attachable to the mounting strap and arranged to extend peripherally around a user's forehead and a side of the user's head;
   an image intensified video camera; and
   a display which is physically separate from the video camera but which is electrically connected thereto;
   wherein the video camera and the display are secured to the mounting platform at different peripheral positions therearound, so that the weight of these components is distributed around a user's head.

16. The man portable device of claim 15 wherein the head mount assembly does not include a helmet.

17. The man portable device of claim 16 wherein the mounting strap is arranged to pass over a user's head from front to back.

18. The man portable device of claim 17 further comprising a nape strap for passing behind the neck of the user, and a battery pack for providing electrical power, wherein the battery pack is mounted on the nape strap to further distribute the weight of the device.

19. The man portable device of claim 15 wherein the display is comprised of an electrically operated flat panel and an optical eyepiece, and wherein the display is secured to the mounting platform in such manner that when the device is worn by a user, both the flat panel and eyepiece are located forward of a user's eyes.

20. The man portable device of claim 19 wherein the image processor is physically embodied either in stacked chips or in a multichip module (MCM) cube.

21. The man portable device of claim 20 wherein each of the video camera and display are in the form of plug connectable modules.

22. The man portable device of claim 21 wherein the display includes a driver, and wherein the driver is physically embodied either in stacked chips or in a multi-chip module (MCM) cube.

23. The man portable device of claim 22 further including a power supply for the video camera including a power supply controller, wherein the power supply controller is embodied either in stacked chips or in a multi-chip module (MCM) cube.

24. The man portable device of claim 19 further including an image processor, which is electrically connected between the video camera and the display.

25. The man portable device of claim 24 wherein the image processor comprises means for performing contrast stretching, detection/enhancement, aperture correction, averaging, and/or mixing and overlaying of intensified video with externally inputted video.

26. The video enhanced night vision device of claim 24 wherein the image processor is arranged to accept an auxiliary input electrical signal indicative of indicia to be displayed and to feed data related thereto to the display to cause the indicia to be displayed at the same time as the video from the image intensified video camera.

27. The man portable device of claim 24 further comprising a thermal camera which is secured to the head mount assembly, wherein electrical signals from the thermal camera are fed to the image processor, and the image processor is arranged to provide data to the display indicative of both signals from the image intensified video camera and the thermal camera in such manner that the respective image intensified video and thermal video images are in spatial correspondence with each other and overlie each other on the display.

28. The man portable device of claim 24 further comprising a power supply for the image intensified video camera, wherein the image intensified video camera includes an image intensifier tube having a cathode, microchannel plate, and screen, and wherein the tube power supply includes an auto-gate means for controlling a voltage which is applied to the cathode.

29. The man portable device of claim 28 further comprising means for receiving video signals outputted from the video camera for controlling the auto-gate based on such signals.

30. The man portable device of claim 29 further including means incorporating non-uniformity look up and coefficients tables for compensating for inherent non-uniformities of the video camera.

31. The man portable device of claim 29 wherein the image processor includes a pair of "ping pong" video frame buffers for alternately storing video signals and feeding signals to the display.

32. The man portable device of claim 31 wherein the image processor includes a third buffer for storing signals from a thermal camera.

33. A man portable video enhanced night vision goggle device, comprising:
   an image intensified video camera;
   a display;
   a self-contained electrical power source; and
   means including a strap for passing over and contacting the center of a user's head and a platform for contacting a user's forehead for mounting the video camera, display and electrical power source on the head of a user without the use of a helmet so that each of the video camera, display, and power source is located at a different longitudinal position around the user's head, so as to distribute the weight of these components therearound.

34. A man portable video enhanced night vision goggle device, comprising:
   a head mount adapted for being worn on the head of a user;
   an image intensified video camera secured to the head mount, the image intensified video camera including an image intensifier tube;
   a display comprised of an electrically operated flat panel and an optical eyepiece, which is secured to the head mount in such position that when the head mount is worn by a user, both the flat panel and the eyepiece are located forward of the user's eyes;
   an electrical connection between the image intensified video camera and the display;
   a power supply for the image intensifier tube;
   wherein the image intensifier tube has a cathode, microchannel plate, and screen, and wherein the power supply includes auto-gate means for controlling a voltage which is applied to the cathode and means for receiving the video signals outputted from the video camera for controlling the auto-gate based on such signals; and a thermal camera and an image processor which are secured to the head mount, wherein electrical signals from the video camera and thermal camera are fed to the image processor, and the image processor is arranged to provide data to the display indicative of both signals from the image intensified video camera and the thermal camera in such manner that the respective image intensified video and thermal video images are in spatial correspondence with each other and overlie each other on the display.

35. A man portable video enhanced night vision goggle device, comprising:

a head mount adapted for being worn on the head of a user;

an image intensified video camera and a thermal camera secured to the head mount;

a display comprised of an electrically operated flat panel and an optical eyepiece, which is secured to the head mount in such position that when the head mount is worn by a user, both the flat panel and the eyepiece are located forward of the user's eyes;

an image processor; and an electrical connection between said cameras, the image processor, and the display; wherein electrical signals from the video camera and thermal camera are fed to the image processor, and the image processor is arranged to provide data to the display indicative of both signals from the image intensified video camera and the thermal camera in such manner that the respective image intensified video and thermal video images are in spatial correspondence with each other and overlie each other on the display.

36. A man portable video enhanced night vision goggle device, comprising:

a head mount adapted for being worn on the head of a user;

an image intensified video camera secured to the head mount;

a display comprised of an electrically operated flat panel and an optical eyepiece, which is secured to the head mount with a mounting means which is configured to enable placement of the eyepiece when the head mount is word by a user directly in front of the user's eye with both the flat panel and eyepiece being located forward of the user's eyes; and an electrical connection between the image intensified video camera and the display;

wherein the head mount is comprised of mounting strap means and platform means to which the video camera and display are secured wherein the mounting strap means and platform means are securable to each other;

wherein the mounting strap means comprises a first strap for passing over the center of the user's head from front to back and wherein the platform means has a first portion which is adapted for placement across at least part of the user's forehead;

wherein the platform means has a second portion extending from the first portion in such position as to be adjacent a user's cheek, wherein the first portion is for securing the display and the second portion is for securing the video camera;

wherein the electrical connection is inside the strap means;

wherein the mounting strap means further includes a second strap for passing behind the nape of a user's neck; and wherein the first portion of the platform means is for extending substantially all the way across a user's forehead, and the platform means includes a third portion extending from the first portion in such position to be adjacent a user's other cheek, further comprising a thermal camera secured to the second or third portions of the platform means.

37. A man portable video enhanced night vision goggle device comprising:

a head mount assembly comprised of a mounting strap for passing over and contacting a user's head and a mounting platform;

an image intensified video camera;

a display; and an electrical connection for connecting the image intensified video camera and the display;

wherein both the image intensified video camera and the display are secured to the mounting platform.

38. The man portable device of claim 37 wherein the mounting platform is arranged to extend across a user's forehead and wherein the display is secured to the mounting platform such that during use it is generally in front of a user's eye while the video camera is secured to the mounting platform such that during use it is to one lateral side of a user's face.

39. The man portable device of claim 38 wherein the mounting platform is arranged to generally conform to the shape of a user's forehead.

40. The man portable device of claim 39 wherein the mounting strap is arranged to pass over the top center of a user's head from front to back.

41. The man portable device of claim 40 wherein the head mount assembly also has a nape strap for passing behind the nape of the user's neck.

42. The man portable device of claim 39 wherein a part of the mounting platform is arranged to extend around a side of the user's head, and the video camera is secured to said part of the mounting platform.

43. The man portable device of claim 42 wherein said part of the mounting platform has a portion which extends downwardly in the direction of a user's cheek, and wherein said video camera is secured to said portion.

44. The man portable device of claim 43 wherein said portion of the mounting platform which extends downwardly has a recessed region for accommodating a user's eyeglass temples.

45. The man portable device of claim 43 wherein the mounting strap is arranged to pass over the top center of a user's head from front to back.

46. The man portable device of claim 39 wherein the mounting platform is arranged to extend around at least one side of the user's head in contact therewith.

47. A man portable video enhanced night vision device comprising a head mount assembly comprised of a mounting strap for passing over and contacting the top of a user's head and a mounting platform having the same general curvature as the front and side of a user's head and arranged to extend peripherally about the front and side of a user's head, an image intensified video camera, a display, and an electrical connection for connecting the video camera and the display, wherein the display is secured to the mounting platform such that it is generally in front of a user's eye while the video camera is secured to a portion of the mounting platform which extends about the side of a user's head, such that the video camera is to one lateral side of a user's head.

48. The man portable device of claim 47 wherein the mounting platform is arranged to extend around the front and side of a user's head while in contact with the user's head.

49. The man portable device of claim 47 wherein the image intensified video camera is secured to the mounting platform such that it is to one side of a user's cheek.

50. A man portable video enhanced night vision device comprising:

a head mount assembly comprised of a mounting strap for passing over and contacting a user's head and a mounting platform arranged to extend about the front and at least one side of a user's head;

an image intensified video camera;

a thermal camera;

a microdisplay;

the microdisplay being secured to the platform;

the image intensified video camera being secured to a portion of the platform which extends around a side of the user's head;

the infrared camera being secured to a portion of the platform which extends around a side of a user's head;

an image processor; and an electrical connection for connecting the cameras, the image processor and the microdisplay;

wherein electrical signals from the image intensified video camera and thermal camera are fed to the image processor, and the image processor is arranged to provide data to the display indicative of both signals from the image intensified video camera and the thermal camera in such manner that the respective image intensified video and thermal video images are in spatial correspondence and overlie each other on the display.

* * * * *

UNITED STATES PATENT AND TRADEMARK OFFICE
CERTIFICATE OF CORRECTION

PATENT NO. : 6,560,029 B1 Page 1 of 1
DATED : May 6, 2003
INVENTOR(S) : Dobbie et al.

It is certified that error appears in the above-identified patent and that said Letters Patent is hereby corrected as shown below:

<u>Column 14,</u>
Line 16, the word "word" should be changed to -- worn --.

<u>Column 17,</u>
Line 48, the word "word" should be changed to -- worn --.

Signed and Sealed this

Ninth Day of December, 2003

JAMES E. ROGAN
*Director of the United States Patent and Trademark Office*